United States Patent
Liu (10) Patent No.: US 9,229,552 B2
(45) Date of Patent: Jan. 5, 2016

(54) SYSTEM AND METHOD FOR SYNCHRONIZED OPERATION OF TOUCH DEVICE

(75) Inventor: Pei Chung Liu, New Taipei (TW)

(73) Assignee: MAGIC CONTROL TECHNOLOGY CORP., New Taipei (TW)

( * ) Notice: Subject to any disclaimer, the term of this patent is extended or adjusted under 35 U.S.C. 154(b) by 605 days.

(21) Appl. No.: 13/553,054

(22) Filed: Jul. 19, 2012

(65) Prior Publication Data

US 2013/0181898 A1    Jul. 18, 2013

(30) Foreign Application Priority Data

Oct. 20, 2011    (TW) .............................. 100138015 A (51) Int. Cl.
- *G06F 3/041*    (2006.01)
- *G06F 3/0488*    (2013.01)
- *G06F 3/14*    (2006.01)

(52) U.S. Cl.
CPC .............. *G06F 3/041* (2013.01); *G06F 3/0488* (2013.01); *G06F 3/14* (2013.01); *G06F 3/1454* (2013.01)

(58) Field of Classification Search
CPC ...... G06F 3/0488; G06F 3/041; G06F 3/1454
USPC ......................................................... 345/173
See application file for complete search history.

(56) References Cited

U.S. PATENT DOCUMENTS

| 8,937,590 | B2 * | 1/2015 | Hachiya | G06F 3/03547 345/1.1 |
| 2009/0271447 | A1 * | 10/2009 | Shin et al. | 707/201 |
| 2011/0093822 | A1 * | 4/2011 | Sherwani | 715/863 |

FOREIGN PATENT DOCUMENTS

TW    201317879 A1    5/2013

OTHER PUBLICATIONS

Notice of Allowance from Taiwan Intellectual Property Office, dated May 25, 2015, for corresponding TW Application No. 100138015.

* cited by examiner

*Primary Examiner* — Koosha Sharifi-Tafreshi
*Assistant Examiner* — Chun-Nan Lin
(74) *Attorney, Agent, or Firm* — Bacon & Thomas, PLLC (57) ABSTRACT

A system and method for synchronized operation of touch device has a mobile touch device which includes a USB transmission interface and a touch screen and an electronic facility host. The USB transmission interface connects to the USB interface of the electronic facility host and synchronizes image displaying, synchronized keyboard operation, and cursor operation so an image of the touch screen of the mobile touch device synchronously opens an image displaying zone on the display device of the electronic facility host and the keyboard and the cursor device directly simulate and synchronously operate touch display operation functions of the mobile touch device in the image displaying zone, operation of file duplication, writing, deletion, and edition between the facility host and the mobile touch device with at least one window of the operation platform of the electronic facility host.

16 Claims, 8 Drawing Sheets

SYSTEM AND METHOD FOR SYNCHRONIZED OPERATION OF TOUCH DEVICE

BACKGROUND OF THE INVENTION

1. Field of the Invention

The present invention relates to a system and method for synchronized operation of touch device, and in particular to a system and method that are applied between a mobile touch device and an electronic facility host for simulating and synchronously operating functions of the mobile touch device at the electronic facility host side.

2. The Related Arts

Mobile touch devices are widely used in communication, multimedia application, and operations of editing, duplicating, and deleting files. Examples include the known smart touch mobile phone, persona digital assistant (PDA), and touch operation based tablet computer. They provide users with operation functions of communication, multimedia application, execution of application program, and editing, duplicating, and deleting files with a finger or a stylus directly contacting a touch screen for pointing and clicking these functions. With the increasing reliance of the users on the mobile touch device and electronic facility host, such as computer host and notebook computer, it becomes increasingly common that a user may use a mobile touch device and an electronic facility host at the same time. To take care of the operations of both the mobile touch device and the electronic facility host at the same time may be a hard-to-handle issue for the general users.

Further, the conventional mobile touch devices are often provided with a touch screen of a size around 3-10 inches due to the requirement for being compact and light-weighted for the mobile touch devices. Consequently, the area of screen for displaying images, texts, or a virtual keyboard is very limited and is impossible to match a fixed display device of computer systems that allows of easy reading for users, especially for the elders and the eye disabled whose eyesight is generally poor and who will have problems to perform complicated operations, such as communication, multimedia application, execution of application program, and editing, duplicating, and deleting files, on the small-sized touch screw of the mobile touch device.

Further, the conventional mobile touch devices can be connected to a computer host in a cabled or wireless manner, but such connection allows of simple operation of file transfer with very complicated process, perhaps requiring complicated man-machine interface and screen to have the operation done. This makes it impossible for people not familiar with computer systems to carry out the operation in a simple and convenient manner. Further, to use the function of file transfer, a user cannot watch the progress of transfer by staring at one single screen, nor can the user monitor the operation on the touch screen of the mobile touch device. The user must then operate the touch screen of the mobile touch device to identify the result of the operation. This causes inconvenience and trouble for the user to use the mobile touch device.

As to related prior art patent documents, an example is Taiwan Patent No. 1220202, which disclose a personal digital assistant integrated personal computer, in which hardware structure of a personal computer is modified to simulate the operational functions of a personal digital assistant. The hardware structure of the personal computer must be changed and the personal digital assistant so simulated cannot be carried as a stand-alone device similar to the conventional personal digital assistants. This makes the portability poor and thus lacking industrial utilization.

Taiwan Patent No. 1344614 discloses a computer system with multi-touch screen, in which a multi-touch computer system with dual display screens is provided. Again, the original hardware structures of the multi-touch mobile touch device or the electronic facility host of the computer host must be modified and this makes it generally not applicable to all sorts of mobile touch devices or electronic facility hosts. Again, it lacks of industrial utilization.

Taiwan Utility Model No. M380532 discloses an electronic device of multi-touch wireless control panel, in which an electronic device of multi-touch wireless control panel and a host module is connected through wireless signals. The electronic device of multi-touch wireless control panel generates speed, trace, and counts with multi-touch signals and generates corresponding control signals in the host module. However, the electronic device of multi-touch wireless control panel requires a signal recording and processing unit that generates signals of instructions of operation and touch and is thus not applicable to the existing touch mobile phone, personal digital assistant and touch tablet computer. Again, it requires modification to be done on the hardware of the existing multi-touch wireless control panel. Further, user's operation of the device of small-sized touch screen for initiating corresponding operations on the display device of the host module is generally tough for the elder and the eye disabled, whose eyesight is generally poor.

SUMMARY OF THE INVENTION

Thus, a primary objective of the present invention is to provide a synchronized operation system of touch device, which comprises at least one mobile touch device and at least one electronic facility host. The mobile touch device comprises at least one USB transmission interface and a touch screen. The USB transmission interface is connectable to the USB interface of the electronic facility host and steps of synchronized image displaying, synchronized keyboard operation, and synchronized cursor operation are adopted to have an image of the touch screen of the mobile touch device to synchronously open at least one image displaying zone on the display device of the electronic facility host and allow the keyboard and the cursor device of the electronic facility host to directly simulate and synchronously operate touch display operation functions of the mobile touch device in the image displaying zone, and to operate file duplication, writing, deletion, and edition between the electronic facility host and the mobile touch device with at least one window of the operation platform of the electronic facility host, so that the mobile touch device synchronously carries out corresponding functions of touch control and file operations.

Another objective of the present invention is to provide a method for synchronized operation of touch device, which comprises the following steps:

(a) at least one mobile touch device being set in connection to at least one electronic facility host, in which a USB transmission interface of the mobile touch device is connected to a USB interface of the electronic facility host;

(b) synchronized image displaying, in which image data of a touch screen of the mobile touch device are transmitted to a display device of the electronic facility host to form at least one image displaying zone;

(c) detecting input data type of the electronic facility host, to proceed to Step (d) for input of keyboard or to Step (e) for input of cursor device;

(d) synchronized keyboard operation, in which a keyboard signal entered through the keyboard of the electronic facility host at Step (c) is applied to execute corresponding functions of data input or control in a window of operation platform of the electronic facility host or the image displaying zone of Step (b), the control function comprising functions of operation including communication, multimedia application, execution of application program, and editing, copying, and deleting files;

(d1) synchronous transmission of result of execution to the mobile touch device, in which the result of data input or control that is executed in the window of the operation platform of the electronic facility host at Step (d) or executed in the image displaying zone of Step (b) is transmitted to the mobile touch device to carry out corresponding functions of touch input of data or control, and then going back to Step (b);

(e) synchronized cursor operation, in which a cursor signal of the electronic facility host, such as a mouse cursor signal, entered through the cursor device at Step (c) is applied to execute corresponding control functions of cursor pointing or clicking in the window of the operation platform of the electronic facility host or the image displaying zone of Step (b); and (e1) synchronous transmission of result of execution to the mobile touch device, in which the result of cursor pointing or control that is executed in the window of the operation platform of the electronic facility host at Step (e) or executed in the image displaying zone of Step (b) is transmitted to the mobile touch device to carry out corresponding functions of touch cursor pointing or control, and then going back to Step (b).

The efficacy of the system and method for synchronized operation of touch device is that, without any modification being made on hardware of a mobile touch device and an electronic facility host, such as a computer host or a notebook computer, through cabled or wireless connection between a USB transmission interface and a USB interface of the mobile touch device and the electronic facility host, the touch screen of the mobile touch device can be synchronously displayed on the display device of the electronic facility host, wherein the electronic facility host may enter input through a keyboard or cursor into the display device to simulate data input or control function on the touch screen and transmit the result of operation to the mobile touch device to allow the mobile touch device to perform corresponding touch control operations, which may comprise communication, multimedia application, execution of application program, and editing, duplicating, and deleting files, so that a user may use the image displaying zone of the display device of the electronic facility host to directly operate the corresponding operation functions of the mobile touch device. Further, it is possible to use at least one window of the operation platform of the computer host facility to operate writing, deleting and editing of files between the mobile touch device and the electronic facility host so that the present invention allows at least one electronic facility host to directly perform touch operations of at least one mobile touch device.

BRIEF DESCRIPTION OF THE DRAWINGS

The present invention will be apparent to those skilled in the art by reading the following description of a preferred embodiment thereof and the best mode for carrying out the invention, with reference to the attached drawings, wherein.

DETAILED DESCRIPTION OF THE PREFERRED EMBODIMENTS

Figure 1:
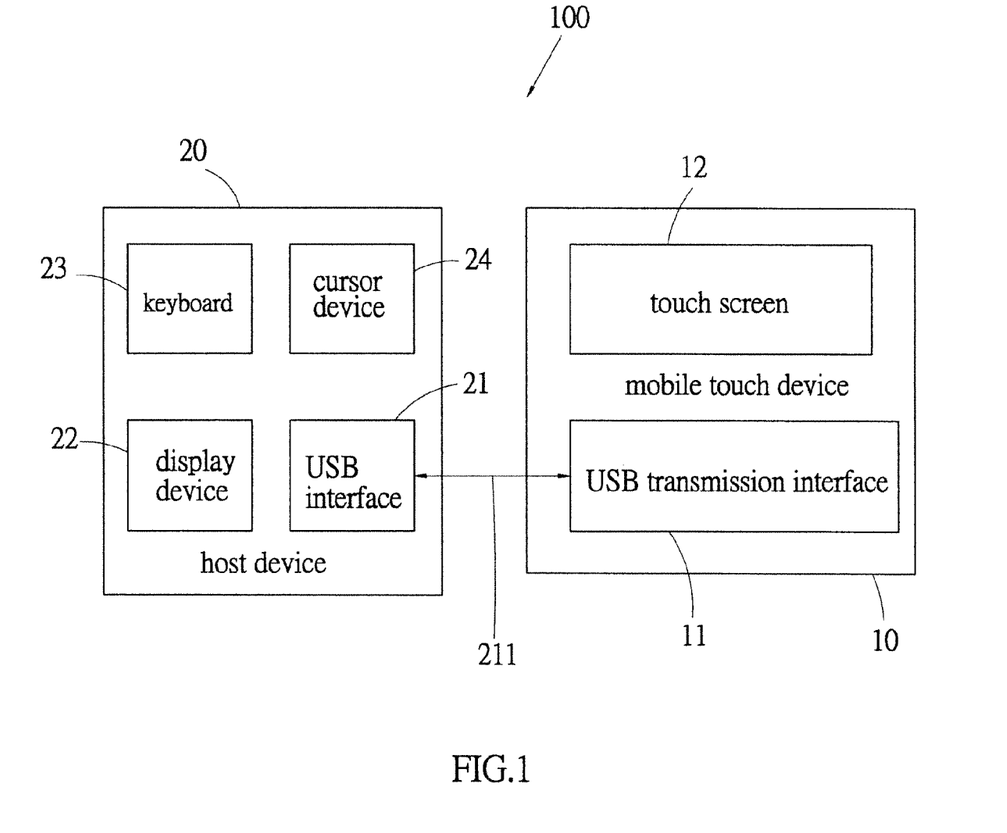
FIG. 1 is a system block diagram of a synchronized operation system constructed in accordance with a first embodiment of the present invention.

With reference to the drawings and in particular to FIG. 1, a synchronized operation system constructed in accordance with a first embodiment of the present invention, generally designated at 100, is provided for a touch device. The system 100 comprises at least one mobile touch device 10, which is not limited to any specific type, and a smart touch mobile phone with built-in android operation system is taken as an example for illustration. However, it is noted that various electronic devices with touch operation function, such as a personal digital assistant and a tablet computer, all belong to the scope of the present invention. The mobile touch device 10 comprises at least one USB transmission interface 11 and a touch screen 12. In the first embodiment, the USB transmission interface 11 is illustrated with an example of USB interface. The touch screen 12 is a display screen capable of operation of multi-touch or single touch.

Figure 2:
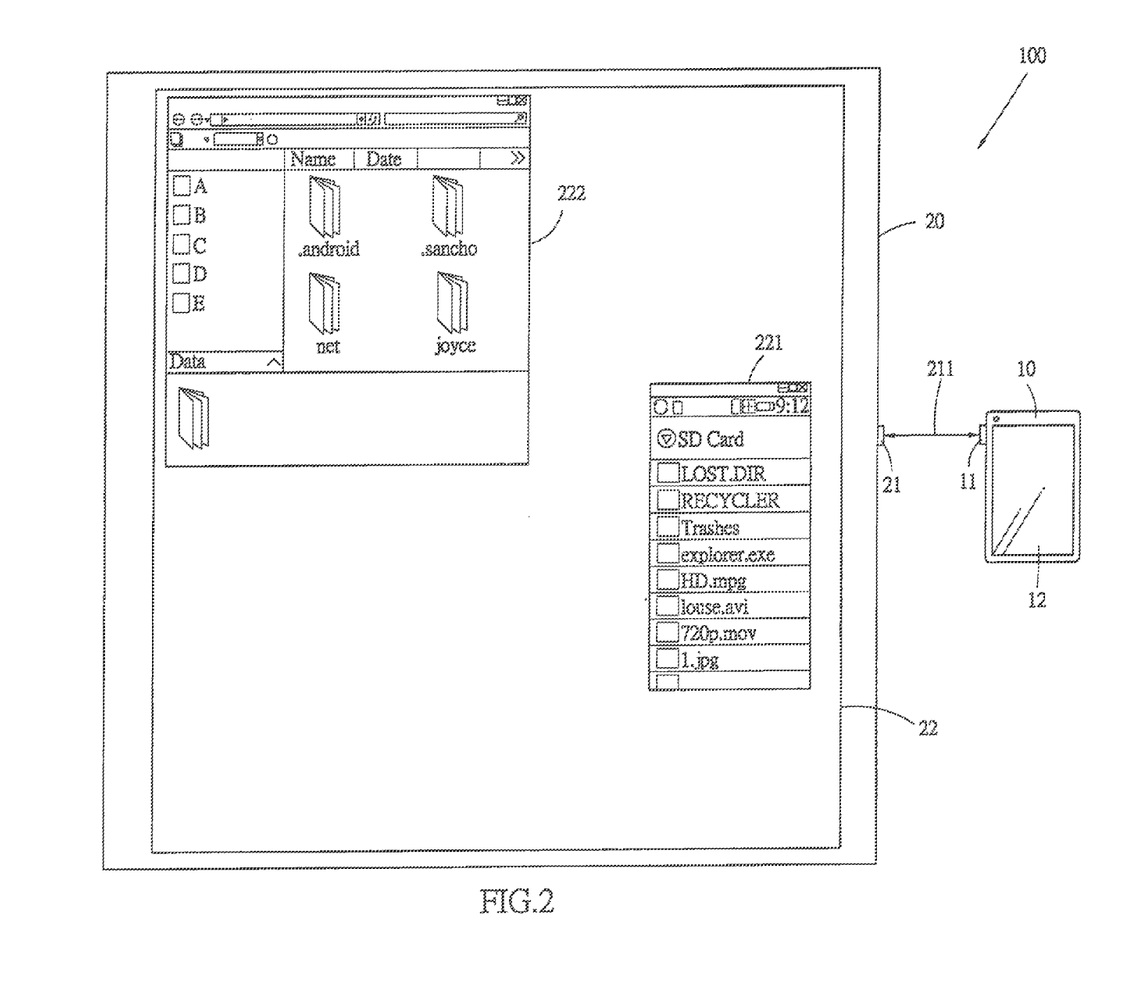
FIG. 2 demonstrates a cabled connection between a mobile touch device and an electronic facility host of the system according to the present invention.

Referring to FIG. 2, at least one host device 20 of electronic facility is provided, which will be referred to as electronic facility host and is not limited to any specific type. In the description, a computer host with built-in WINDOWS operation platform is taken as an example. The electronic facility host 20 comprises a USB interface 21, a display device 22, a keyboard 23, and a cursor device 24, such as a mouse. In the first embodiment of the present invention, a cabled USB interface receptacle is taken as an example of the USB interface 21, which is connected through a USB cable 211 to the USB transmission interface 11 of the mobile touch device 10. The present invention illustrates, as an example, the connection is made with the mobile touch device 10 being set in a slave mode and the electronic facility host 20 in a master mode. An advantage of this arrangement is that operations can be made with the mobile touch device 10 being set in a charging condition, an image of the touch screen 12 of the mobile touch device 10 may be synchronously shown in at least one image displaying zone 221 (as shown in FIG. 2) formed on the display device 22 of the electronic facility host 20, the keyboard 23 and the cursor device 24 of the electronic facility host 20 are allowed to simulate and synchronously operate the touch display operation functions of the mobile touch device 10 in the image displaying zone 221. The touch display operation functions may comprise the operation functions of for example communication, multimedia application, execution of application programs, and editing, copying, and deleting of files. And, with at least one window 222 of the operation platform of the electronic facility host 20, copying, writing, deleting, and editing of files can be performed between the electronic facility host 20 and the mobile touch device 10, so that the mobile touch device 10 may synchronously execute corresponding functions of touch control and file operations.

Figure 3:
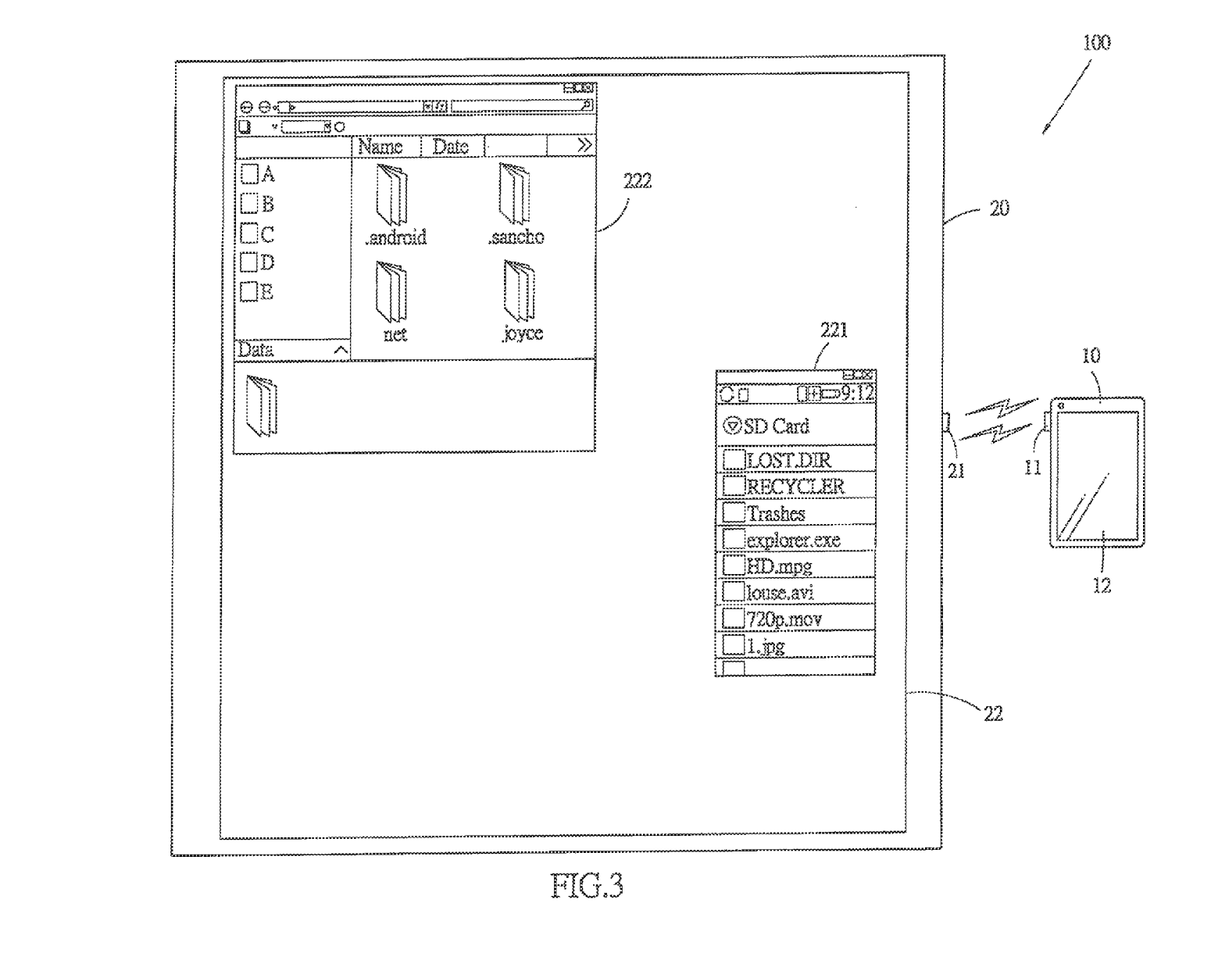
FIG. 3 is a system block of a system constructed in accordance with a second embodiment of the present invention.

Referring to FIG. 3, a system 100 according to a second embodiment of the present invention is shown, in which the USB transmission interface 11 of the mobile touch device 10 is shown as a wireless USB transmission interface and the USB interface 21 of the electronic facility host 20 is a wireless USB communication interface, so that through WIFI based wireless USB transmission mode, the USB transmission interface 11 of the mobile touch device 10 and the USB interface 21 of the electronic facility host 20 may be connected to each other.

Figure 4:
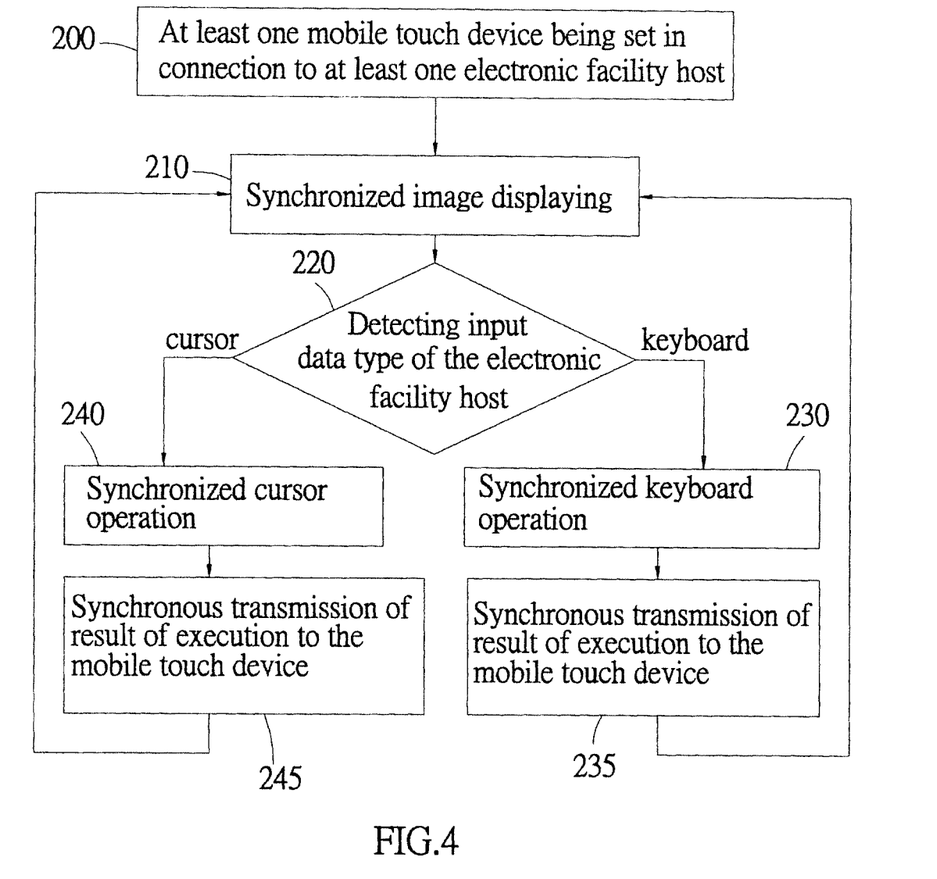
FIG. 4 is a flow chart illustrating a method for synchronized operation of touch device according to the present invention.

Referring to FIG. 4, a flow chart is given to illustrate a method for synchronized operation of touch device according to the present invention, comprising Steps 200-245, wherein:

Step 200: At least one mobile touch device being set in connection to at least one electronic facility host, in which the USB transmission interface 11 of the mobile touch device 10 is connected to the USB interface 21 of the electronic facility host 20 in a cabled or wireless manner;

Step 210: Synchronized image displaying, in which image data of the touch screen 12 of the mobile touch device 10 of Step 200 are transmitted to the display device 22 of the electronic facility host 20 to form at least one image displaying zone 221;

Step 220: Detecting input data type of the electronic facility host, in which the flow goes to Step 230 for input of the keyboard 23 or to Step 240 for input of the cursor device 24;

Step 230: Synchronized keyboard operation, in which a keyboard signal entered through the keyboard 23 of the electronic facility host 20 at Step 220 is applied to execute corresponding functions of data input or control in the window 222 of the operation platform of the electronic facility host 20 or the image displaying zone 221 of Step 210, and the control function comprises functions of operation including communication, multimedia application, execution of application program, and editing, copying, and deleting files;

Step 235: Synchronous transmission of result of execution to the mobile touch device, in which the result of data input or control that is executed in the window 222 of the operation platform of the electronic facility host 20 at Step 230 or executed in the image displaying zone 221 of Step 210 is transmitted to the mobile touch device 10 to carry out corresponding functions of touch input of data or control, and then the flow goes back to Step 210;

Step 240: Synchronized cursor operation, in which a cursor signal of the electronic facility host 20, such as a mouse cursor signal, entered through the cursor device 24 at Step 220 is applied to execute corresponding control functions of cursor pointing or clicking in the window 222 of the operation platform of the electronic facility host 20 or the image displaying zone 221 of Step 210;

Step 245: Synchronous transmission of result of execution to the mobile touch device, in which the result of cursor pointing or control that is executed in the window 222 of the operation platform of the electronic facility host 20 at Step 240 or executed in the image displaying zone 221 of Step 210 is transmitted to the mobile touch device 10 to carry out corresponding functions of touch cursor pointing or control, and then the flow goes back to Step 210.

The above described Steps 200-245 of the method according to the present invention can be pre-installed and stored, in the form of programs, in the mobile touch device 10 and the electronic facility host 20.

Figure 5:
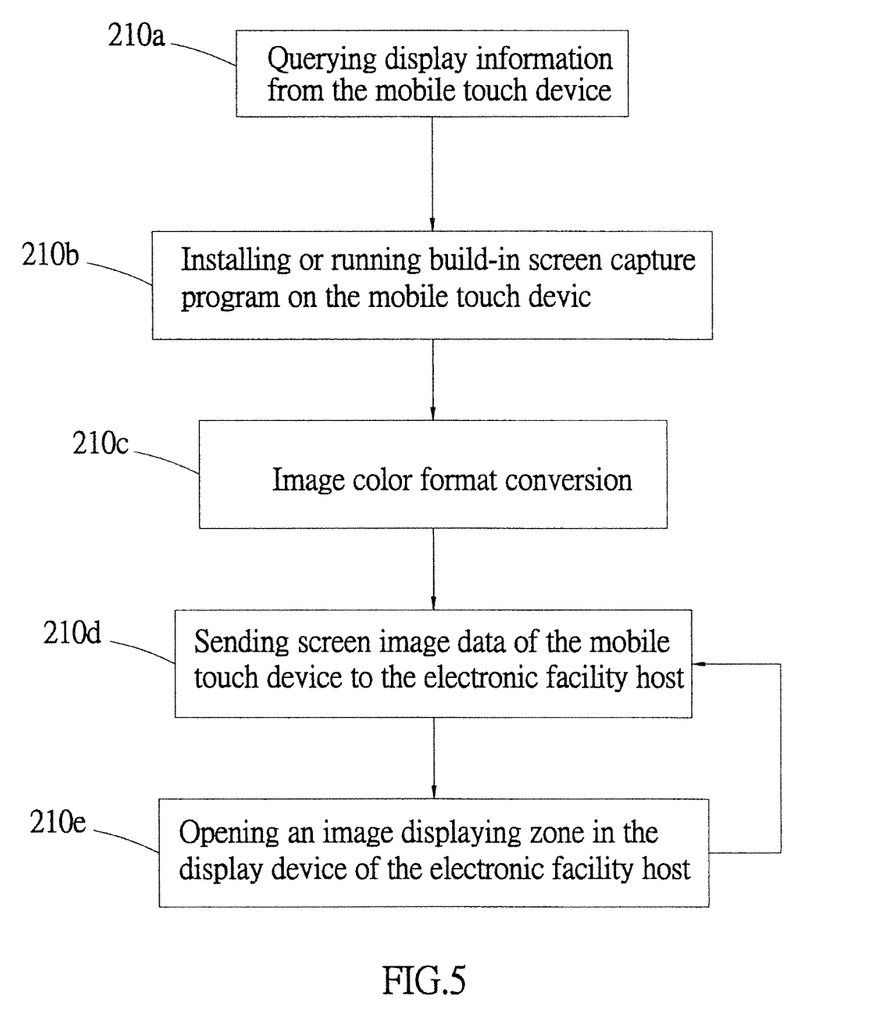
FIG. 5 is a flow chart illustrating an example of a step of synchronized image displaying according to the method of the present invention.

Referring to FIG. 5, which is an example of the operation of synchronized image displaying according to Step 210 of the method of the present invention shown in FIG. 4 and comprising the following Steps 210*a*-210*e*:

Step 210*a*: Querying display information from the mobile touch device, in which the electronic facility host 20 makes a query through the USB interface 21, in a cabled or wireless manner, to the mobile touch device 10 via the USB transmission interface 11 for display information of the touch screen 22;

Step 210*b*: Installing or running build-in screen capture program on the mobile touch device, in which based on the result of querying display information of Step 210*a*, the electronic facility host 20 installs and executes a mobile touch device image capture process in the mobile touch device 10, in order to carry out a screen image capture operation of the touch screen 22 of the mobile touch device 10;

Step 210*c*: Image color format conversion, in which based on the screen image of the touch screen 12 of the mobile touch device 10 captured at Step 210*b*, image color format conversion processing is performed, such as converting the image color format from RGB 32 bits into RGB 24 bits or RGB 16 bits.

Step 210*d*: Sending screen image data of the mobile touch device to the electronic facility host, in which the screen image data of the touch screen 12 of the mobile touch device 10 of which the image color format was converted at Step 210*c* are transmitted to the electronic facility host 20;

Step 210*e*: Opening an image displaying zone in the display device of the electronic facility host, in which the screen image data of the touch screen of the mobile touch device 10 that was received by the electronic facility host 20 at Step 210*d* are applied to open an image displaying zone 221 on the display device 22 in order to show images of the screen of the mobile touch device on a specific program running on the host side, and the flow goes back to Step 210*d*.

Figure 6:
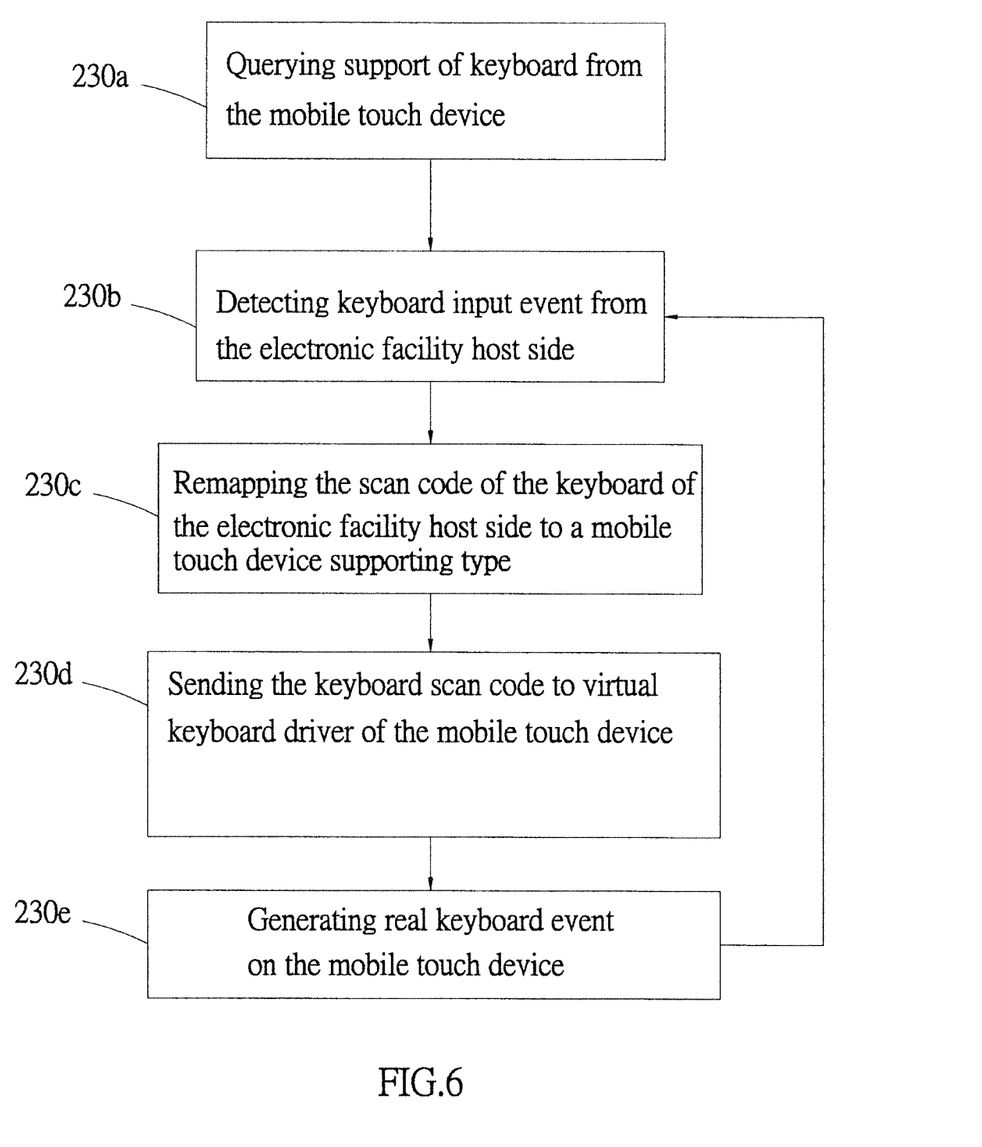
FIG. 6 is flow chart illustrating an example of a step of synchronized keyboard operation according to the method of the present invention.

Referring to FIG. 6, which is an example of the synchronized keyboard operation according to Step 230 of the method of the present invention shown in FIG. 4 and comprising the following Steps 230*a*-230*e*:

Step 230*a*: Querying support of keyboard from the mobile touch device, in which the electronic facility host 20 makes a query through the USB interface 21, in a cabled or wireless manner, to the mobile touch device 10 via the USB transmission interface 11 for support of keyboard function of the touch screen 22;

Step 230*b*: Detecting keyboard input event from the electronic facility host side, in which the electronic facility host 20 of Step 230*a* detects an input event of the keyboard 23;

Step 230*c*: Remapping the scan code of the keyboard of the electronic facility host side to a mobile touch device supporting type, in which based on the keyboard input event detected in Step 230*b*, the electronic facility host 20 remaps scan code of the keyboard 23 to a type supported by the mobile touch device 10 of Step 230*a*;

Step 230*d*: Sending the keyboard scan code to virtual keyboard driver of the mobile touch device, in which the electronic facility host 20 transmits the remapped keyboard scan code generated at Step 230*c* to a virtual keyboard driver of the mobile touch device 10;

Step 230*e*: Generating real keyboard event on the mobile touch device, in which based on the remapped keyboard scan code received at Step 230*d*, the mobile touch device 10 generates a real keyboard event and executes the virtual keyboard touch operation function of the touch device 10, and the flow goes back to Step 230*b*.

Figure 7:
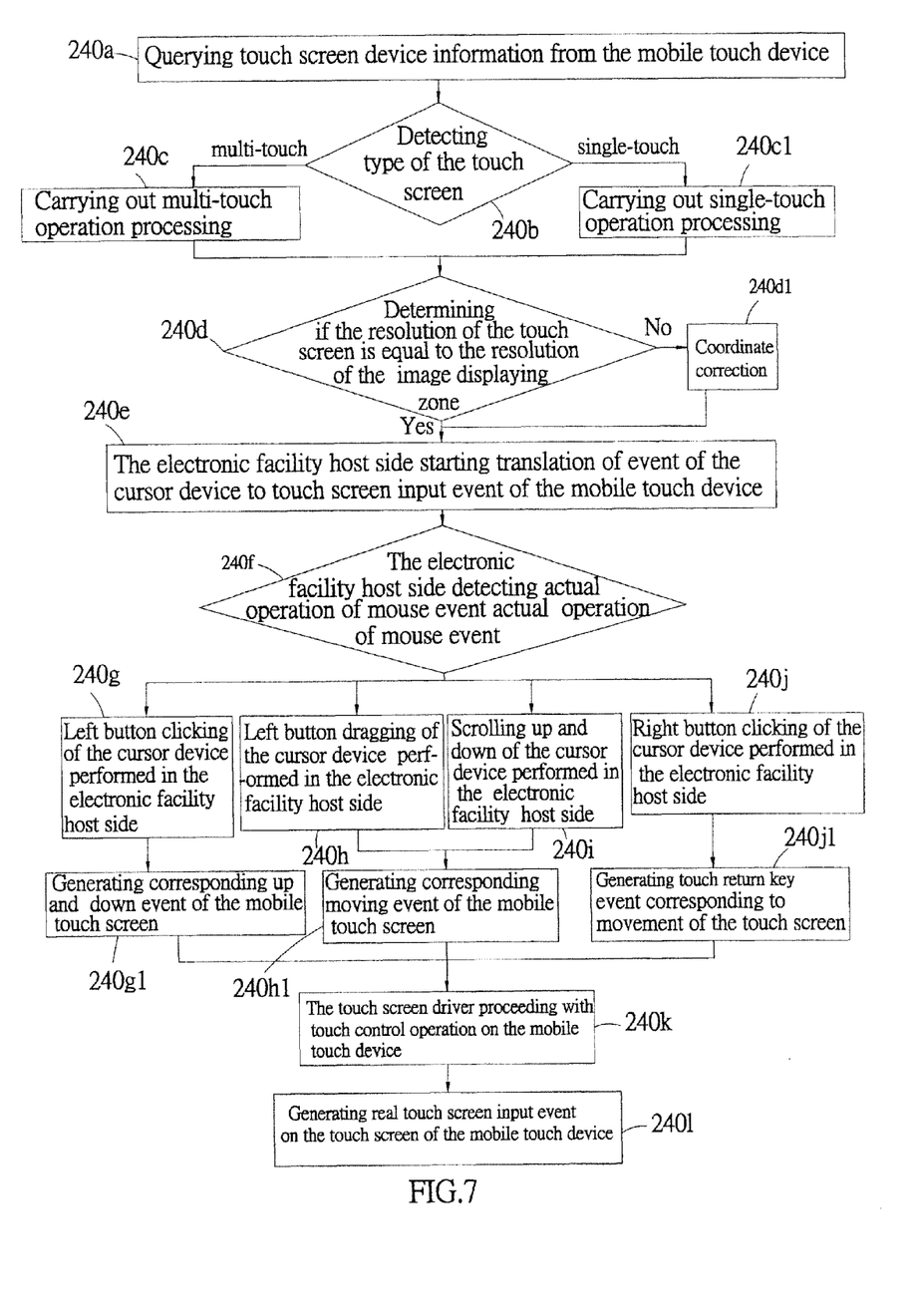
FIG. 7 is a flow chart illustrating an example of a step of synchronized cursor operation according to the method of the present invention.

Referring to FIG. 7, which is an example of the synchronized cursor operation according to Step 240 of the method of the present invention shown in FIG. 4 and comprising the following Steps 240a-240l:

Step 240a: Querying touch screen device information from the mobile touch device, in which the electronic facility host 20 makes a query through the USB interface 21, in a cabled or wireless manner, to the mobile touch device 10 via the USB transmission interface 11 for functions of cursor pointing and touch displaying of the touch screen 22;

Step 240b: Detecting type of the touch screen, in which the electronic facility host 20 of Step 240a detects the type of the touch screen 22 of the mobile touch device 10 to be a multi-touch mode or a single-touch mode and the flow goes to Step 240c for multi-touch and goes to Step 240c1 for single-touch;

Step 240c: Carrying out multi-touch operation processing, in which the electronic facility host 20 carries out resolution operation processing for coordinates of the touch screen 22 and the image displaying zone 221 of Step 240b for multi-touch mode and the flow goes to Step 240d;

Step 240c1: Carrying out single-touch operation processing, in which the electronic facility host 20 carries out resolution operation processing for coordinates of the touch screen 22 and the image displaying zone 221 of Step 240b for single-touch mode and the flow goes to Step 240d;

Step 240d: Determining if the resolution of the touch screen is equal to the resolution of the image displaying zone, in which if the answer is positive, the flow goes to Step 240e, and if negative, the flow goes to Step 241d1;

Step 240d1: Coordinate correction, in which correction of coordinate data is performed between the touch screen 22 of Step 241c and the image displaying zone 221 to make the resolutions thereof equal;

Step 240e: The electronic facility host side starting translation of event of the cursor device to touch screen input event of the mobile touch device, in which the electronic facility host 20 translates coordinates of an input event of the cursor device 24 to coordinates of input event of the touch screen 12 of the mobile touch device 10;

Step 240f: The electronic facility host side detecting actual operation of mouse event, in which the flow goes to Step 240g for left button clicking of the cursor device 24; the flow goes to Step 240h for left button dragging of the cursor device 24; the flow goes to Step 240i for scrolling up/down of the cursor device 24; and the flow goes to Step 240j for right button clicking of the cursor device 24;

Step 240g: Left button clicking of the cursor device performed in the electronic facility host side, in which the electronic facility host 20 performs an operation function of left button clicking of the cursor device 24, resembling a mouse, in at least one window 222 of the operation platform or the image displaying zone 221;

Step 240g1: Generating corresponding up and down event of the mobile touch screen, in which the electronic facility host side 20 generates a corresponding screen touch up and down event for the touch screen 12 of the mobile touch device 10 and the flow goes to Step 240k;

Step 240h: Left button dragging of the cursor device performed in the electronic facility host side, in which the electronic facility host 20 performs an operation function of left button dragging of the cursor device 24, resembling a mouse, in at least one window 222 of the operation platform or the image displaying zone 221;

Step 240h1: Generating corresponding moving event of the mobile touch screen, in which the electronic facility host side 20 generates a corresponding screen touch moving event for the touch screen 12 of the mobile touch device 10 and the flow goes to Step 240k;

Step 240i: Scrolling up and down of the cursor device performed in the electronic facility host side, in which the electronic facility host 20 performs an operation function of scrolling up and down of the cursor device 24, resembling a mouse, in at least one window 222 of the operation platform or the image displaying zone 221, and the flow goes to Step 240h1;

Step 240j: Right button clicking of the cursor device performed in the electronic facility host side, in which the electronic facility host 20 performs an operation function of right button clicking of the cursor device 24, resembling a mouse, in at least one window 222 of the operation platform or the image displaying zone 221;

Step 240j1: Generating touch return key event corresponding to movement of the touch screen, in which the electronic facility host 20 generates a screen touch return key event on the touch screen 12 of the mobile touch device 10 and the flow goes to Step 240k;

Step 240k: The touch screen driver proceeding with touch control operation on the mobile touch device, in which the electronic facility host 20 transmits the screen touch event of the touch screen 12 of the mobile touch device 10 at Step 240g1, 240h1, or 240j1 to the touch screen driver of the touch screen 12 of the mobile touch device to proceed with the associated touch control operation;

Step 240l: Generating real touch screen input event on the touch screen of the mobile touch device, in which the touch screen 12 of the mobile touch device 10 generates a real touch control operation of the driver of Step 240k, and Step 240f is then repeated.

Figure 8:
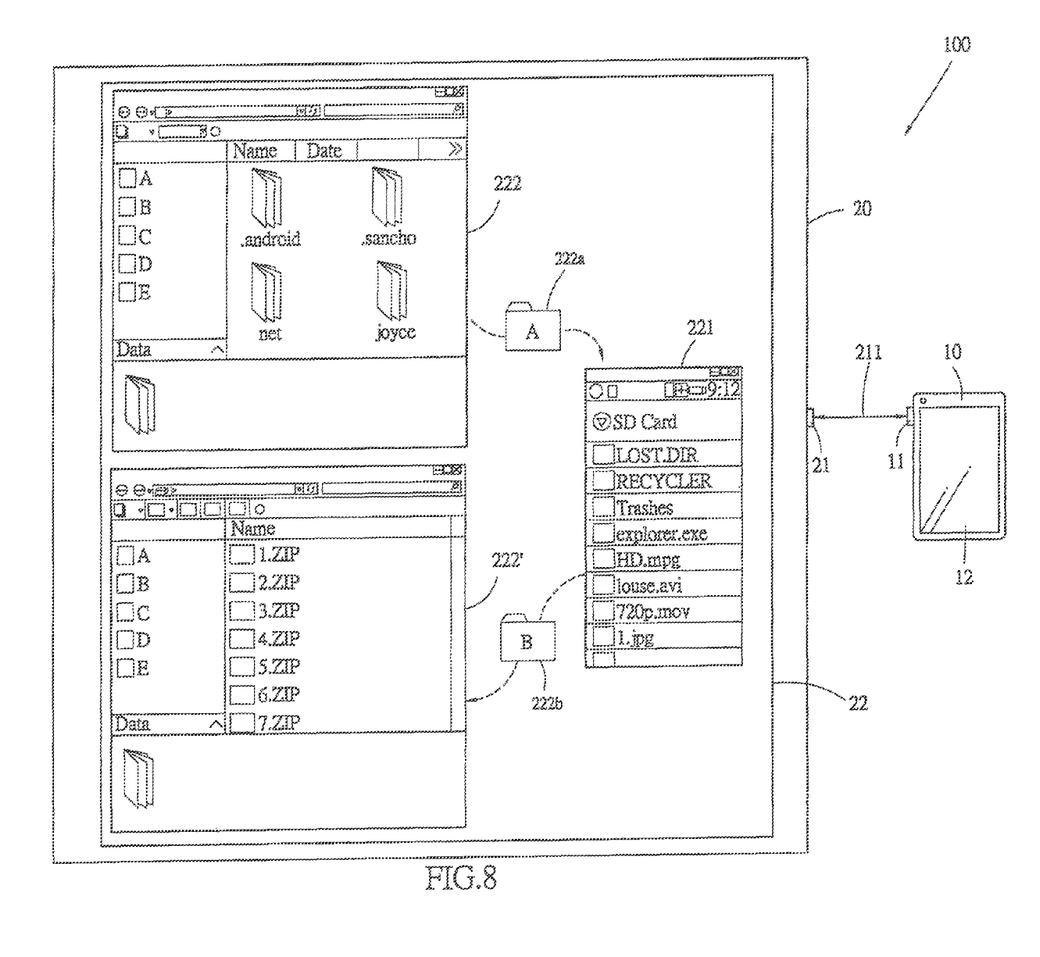
FIG. 8 illustrates an example of preferred application of the system according the present invention.

Referring to FIG. 8, an example of preferred application of the synchronized operation system 100 of the touch device according to the present invention is illustrated, wherein the electronic facility host 20 is allowed to enter data or control function to the image displaying zone 221 through the keyboard 23 to make the touch screen 12 of the mobile touch device 10 generating a corresponding screen touch operation of data input or control and is also allowed to make displaying on a screen of the operation platform of the display device 22 of the electronic facility host 20 to allow of direct use of the left button dragging operation of the cursor device 24 to directly drag "A" file folder 222a of the window 222 to the image displaying zone 221 for file duplication, so that the touch screen 12 of the mobile touch device 10 is caused to a corresponding real touch control operation of transmission, duplication, and storage of the "A" file folder 222a to a memory of the mobile touch device 10; further, it may also be displayed so that through the left button dragging operation of the cursor device 24, a "B" file folder 222b located in the image displaying zone 221 may be subjected to a dragging operation for duplication in another window 222' of the operation platform of the display device 22 of the electronic facility host 20, so that the "B" file folder 222b that was originally stored in the mobile touch device 10 is transmitted to the window 222' of the operation platform of the computer host 20 for duplication and storage.

Although the present invention has been described with reference to the preferred embodiment thereof and the best mode for carrying out the invention, it is apparent to those skilled in the art that a variety of modifications and changes may be made without departing from the scope of the present invention which is intended to be defined by the appended claims.

What is claimed is:

1. A synchronized operation system of touch device, comprising:

at least one mobile touch device, which comprises at least one USB transmission interface and a touch screen, the touch screen being operated with touch control; and at least one electronic facility host, which comprises a USB interface, a display device, a keyboard and, a cursor device, the USB interface being connectable with the USB transmission interface of the mobile touch device, wherein the electronic facility host enquires, through a USB transmission interface, the mobile touch device about display information of a touch screen and then installs and executes an image capturing program on the mobile touch device according to a result of the enquiry about the display information, so as to capture frame images of the touch screen of the mobile touch device, synchronize the frames of the touch screen of the mobile touch device, perform an image color format conversion process on the captured frame images of the touch screen of the mobile touch device, and send data pertaining to the frame images which have undergone the image color format conversion process to the electronic facility host such that, according to the received frame images data of the touch screen of the mobile touch device, the electronic facility host allows an image of the touch screen of the mobile touch device to open at least one image displaying zone in the display device of the electronic facility host and to allow the keyboard and the cursor device of the electronic facility host to directly simulate and synchronously operate touch display operation functions of the mobile touch device in the image displaying zone, and to operate file duplication, writing, deletion, and edition between the electronic facility host and the mobile touch device with at least one window of the operation platform of the electronic facility host, so that the mobile touch device synchronously carries out corresponding functions of touch control and file operations.

2. The synchronized operation system of touch device as claimed in claim 1, wherein the USB transmission interface is a wireless USB transmission interface.

3. The synchronized operation system of touch device as claimed in claim 1, wherein the touch screen comprises a multi-touch screen.

4. The synchronized operation system of touch device as claimed in claim 1, wherein the touch screen comprises a single-touch screen.

5. The synchronized operation system of touch device as claimed in claim 1, wherein the mobile touch device comprises a smart touch mobile phone.

6. The synchronized operation system of touch device as claimed in claim 1, wherein the mobile touch device comprises a personal digital assistant with touch control functions.

7. The synchronized operation system of touch device as claimed in claim 1, wherein the mobile touch device comprises a tablet computer with touch control functions.

8. The synchronized operation system of touch device as claimed in claim 1, wherein the electronic facility host comprises a computer host.

9. The synchronized operation system of touch device as claimed in claim 1, wherein the electronic facility host comprises a notebook computer.

10. The synchronized operation system of touch device as claimed in claim 1, wherein the USB interface of the electronic facility host comprises a wireless USB communication interface.

11. The synchronized operation system of touch device as claimed in claim 1, wherein the touch display operation functions of the mobile touch device that are directly simulated and synchronously operated by the keyboard and the cursor device of the electronic facility host in the image displaying zone comprise communication, multimedia application, execution of application program, and editing, copying, and deleting of file.

12. A method for synchronized operation of touch device, comprising the following steps:

(A) at least one mobile touch device being set in connection to at least one electronic facility host, in which a USB transmission interface of the mobile touch device is connected to a USB interface of the electronic facility host;

(B) synchronized image displaying, including searching the mobile touch device for display information of the touch screen by the electronic facility host of step A through a USB transmission interface, installing and executing an image capturing program on the mobile touch device by the electronic facility host according to the display information search result, so as to capture frame images of the touch screen of the mobile touch device, performing an image color format conversion process on the captured frame images of the touch screen of the mobile touch device, sending data pertaining to the captured frame images which have undergone the image color format conversion process to an electronic facility host, such that the electronic facility host opens at least a mapping block in the display device according to the received data of frame images of the touch screen of the mobile touch device;

(C) detecting input data type of the electronic facility host, to proceed to Step (D) for input of keyboard or to Step (E) for input of cursor device;

(D) synchronized keyboard operation, in which a keyboard signal entered through the keyboard of the electronic facility host at Step (C) is applied to execute corresponding functions of data input or control in a window of operation platform of the electronic facility host or the image displaying zone of Step (B), the control function comprising functions of operation including communication, multimedia application, execution of application program, and editing, copying, and deleting files;

(D1) synchronous transmission of result of execution to the mobile touch device, in which the result of data input or control that is executed in the window of the operation platform of the electronic facility host at Step (D) or executed in the image displaying zone of Step (B) is transmitted to the mobile touch device to carry out corresponding functions of touch input of data or control, and then going back to Step (B);

(E) synchronized cursor operation, in which a cursor signal of the electronic facility host, such as a mouse cursor signal, entered through the cursor device at Step (C) is applied to execute corresponding control functions of cursor pointing or clicking in the window of the operation platform of the electronic facility host or the image displaying zone of Step (B); and (E1) synchronous transmission of result of execution to the mobile touch device, in which the result of cursor pointing or control that is executed in the window of the operation platform of the electronic facility host at Step (E) or executed in the image displaying zone of Step (B)

is transmitted to the mobile touch device to carry out corresponding functions of touch cursor pointing or control, and then going back to Step (B).

13. The method as claimed in claim 12, wherein the USB transmission interface of the mobile touch device of Step (A) is connected in a cabled manner with a USB cable to the USB interface of the electronic facility host.

14. The method as claimed in claim 12, wherein the USB transmission interface of the mobile touch device of Step (A) is connected in a wireless manner to the USB interface of the electronic facility host.

15. The method as claimed in claim 12, wherein the synchronized keyboard operation of Step (D) comprises the following steps:
- (D11) querying support of keyboard from the mobile touch device, in which the electronic facility host makes a query through the USB interface, in a cabled or wireless manner, to the mobile touch device via the USB transmission interface for support of keyboard function of the touch screen;
- (D12) detecting keyboard input event from the electronic facility host side, in which the electronic facility host of Step (D11) detects an input event of the keyboard;
- (D13) remapping the scan code of the keyboard of the electronic facility host side to a mobile touch device supporting type, in which based on the keyboard input event detected in Step (D12), the electronic facility host remaps scan code of the keyboard to a type supported by the mobile touch device of Step (D11);
- (D14) sending the keyboard scan code to virtual keyboard driver of the mobile touch device, in which the electronic facility host transmits the remapped keyboard scan code generated at Step (D13) to a virtual keyboard driver of the mobile touch device; and
- (D15) generating real keyboard event on the mobile touch device, in which based on the remapped keyboard scan code received at Step (D14), the mobile touch device generates a real keyboard event and executes the virtual keyboard touch operation function of the touch device, and going back to Step (D12).

16. The method as claimed in claim 12, wherein the synchronized cursor operation of Step (E) comprises the following steps:
- (E11) querying touch screen device information from the mobile touch device, in which the electronic facility host makes a query through the USB interface to the mobile touch device via the USB transmission interface for functions of cursor pointing and touch displaying of the touch screen;
- (E12) detecting type of the touch screen, in which the electronic facility host of Step (E11) detects the type of the touch screen of the mobile touch device to be a multi-touch mode or a single-touch mode and proceeding to Step (E13) for multi-touch and to Step (E14) for single-touch;
- (E13) carrying out multi-touch operation processing, in which the electronic facility host carries out resolution operation processing for coordinates of the touch screen and the image displaying zone of Step (E12) for multi-touch mode and going to Step (E15);
- (E14) carrying out single-touch operation processing, in which the electronic facility host carries out resolution operation processing for coordinates of the touch screen and the image displaying zone of Step (E12) for single-touch mode and going to Step (E15);
- (E15) determining if resolution of the touch screen is equal to resolution of the image displaying zone, in which if the answer is positive, proceeding to Step (E17) and if negative, proceeding to Step (E16);
- (E16) coordinate correction, in which correction of coordinate data is performed between the touch screen of Step (E13) and the image displaying zone to make the resolutions thereof equal;
- (E17) the electronic facility host side starting translation of event of the cursor device to touch screen input event of the mobile touch device, in which the electronic facility host translates coordinates of an input event of the cursor device to coordinates of input event of the touch screen of the mobile touch device;
- (E18) the electronic facility host side detecting actual operation of mouse event to proceed to Step (E19) for left button clicking of the cursor device; to Step (E20) for left button dragging of the cursor device; to Step (E21) for scrolling up/down of the cursor device; and to Step (E22) for right button clicking of the cursor device;
- (E19) left button clicking of the cursor device performed in the electronic facility host side, in which the electronic facility host performs an operation function of left button clicking of the cursor device, resembling a mouse, in at least one window of the operation platform or the image displaying zone;
- (E191) generating corresponding up and down event of the mobile touch screen, in which the electronic facility host side generates a corresponding screen touch up and down event for the touch screen of the mobile touch device and going to Step (E23);
- (E20) left button dragging of the cursor device performed in the electronic facility host side, in which the electronic facility host performs an operation function of left button dragging of the cursor device, resembling a mouse, in at least one window of the operation platform or the image displaying zone;
- (E201) generating corresponding moving event of the mobile touch screen, in which the electronic facility host side generates a corresponding screen touch moving event for the touch screen of the mobile touch device and going to Step (E23);
- (E21) scrolling up and down of the cursor device performed in the electronic facility host side, in which the electronic facility host performs an operation function of scrolling up and down of the cursor device, resembling a mouse, in at least one window of the operation platform or the image displaying zone and going to Step (E201);
- (E22) right button clicking of the cursor device performed in the electronic facility host side, in which the electronic facility host performs an operation function of right button clicking of the cursor device, resembling a mouse, in at least one window of the operation platform or the image displaying zone;
- (E221) generating touch return key event corresponding to movement of the touch screen, in which the electronic facility host generates a screen touch return key event on the touch screen of the mobile touch device and going to Step (E23);
- (E23) the touch screen driver proceeding with touch control operation on the mobile touch device, in which the electronic facility host transmits the screen touch event of the touch screen of the mobile touch device at Step (E191), (E201), or (E221) to the touch screen driver of the touch screen 12 of the mobile touch device to proceed with the associated touch control operation; and
- (E24) generating real touch screen input event on the touch screen of the mobile touch device, in which the touch screen of the mobile touch device generates a real touch control operation of the driver of Step (E23), and repeating Step (E18).

* * * * *